United States Patent
Huang et al.

(10) Patent No.: US 10,342,213 B2
(45) Date of Patent: Jul. 9, 2019

(54) AUTOMATIC FEEDER AND FEEDING PIPE THEREOF

(71) Applicant: GUANGDONG PROVINCE MODERN AGRICULTURAL EQUIPMENT RESEARCH INSTITUTE, Guangzhou (CN)

(72) Inventors: Ruisen Huang, Guangzhou (CN); Rikai Zhong, Guangzhou (CN); Kaiyun Wang, Guangzhou (CN); Jiansheng Cao, Guangzhou (CN)

(73) Assignee: GUANGDONG PROVINCE MODERN AGRICULTURAL EQUIPMENT RESEARCH INSTITUTE, Guangzhou (CN)

( * ) Notice: Subject to any disclaimer, the term of this patent is extended or adjusted under 35 U.S.C. 154(b) by 299 days.

(21) Appl. No.: 15/323,478

(22) PCT Filed: Mar. 9, 2016

(86) PCT No.: PCT/CN2016/000122
§ 371 (c)(1),
(2) Date: Jan. 3, 2017

(87) PCT Pub. No.: WO2016/141771
PCT Pub. Date: Sep. 15, 2016

(65) Prior Publication Data
US 2017/0142930 A1    May 25, 2017

(30) Foreign Application Priority Data
Mar. 10, 2015 (CN) .......................... 2015 1 0102416

(51) Int. Cl.
*A01K 5/02* (2006.01)
*A01K 7/06* (2006.01)

(52) U.S. Cl.
CPC .......... *A01K 5/0241* (2013.01); *A01K 5/0216* (2013.01); *A01K 5/0258* (2013.01); *A01K 7/06* (2013.01)

(58) Field of Classification Search
CPC .... A01K 39/0113; A01K 39/012; A01K 5/01; A01K 5/0216; A01K 5/0225; A01K 5/0233
(Continued)

(56) References Cited

U.S. PATENT DOCUMENTS

| 4,508,061 A | 4/1985 | Swearingin |
| 2010/0239708 A1* | 9/2010 | Bachman ................. A01K 5/00 426/2 |

(Continued)

FOREIGN PATENT DOCUMENTS

| CN | 202262310 U | 6/2012 |
| CN | 202652974 U | 1/2013 |

(Continued)

OTHER PUBLICATIONS

PCT International Search Report dated Jun. 14, 2016 from corresponding Application No. PCT/CN2016/000122.

*Primary Examiner* — Yvonne R Abbott-Lewis
(74) *Attorney, Agent, or Firm* — Dilworth IP, LLC

(57) ABSTRACT

The present invention relates to an automatic feeder and a feeding pipe thereof. A feeding pipe (1) discharges a feed when a pig gnaws a gnawing block (12) thereon, and when the gnawing block (12) is gnawed, a pressure sensor (14) is triggered; a hopper (2) is configured to be filled with a dry feed material; one end of a spiral conveyor (3) is connected with a motor (4), the other end of the spiral conveyor is located in the feeding pipe (1), and the spiral conveyor (3) is configured to convey the dry feed material in the hopper (2) to the feeding pipe (1); the motor (4) provides power for rotation of the spiral conveyor (3); a water supply pipeline (Continued)

(5) provides water for the dry feed material in the feeding pipe (1) for feed mixing; and after receiving a triggering signal of the pressure sensor (14), a control unit (7) controls the motor (4) to be powered on and the water supply pipeline (5) to be opened simultaneously, and when not receiving the triggering signal of the pressure sensor (14), the control unit (7) controls the motor (4) to be powered off and the water supply pipeline (5) to be closed.

10 Claims, 5 Drawing Sheets

(58) Field of Classification Search
USPC ....... 119/52.3, 57.9, 51.5, 54, 57.8, 61.2, 71
See application file for complete search history.

(56) References Cited

U.S. PATENT DOCUMENTS

| | | | |
|---|---|---|---|
| 2014/0083364 A1* | 3/2014 | Anderson | A01K 5/01 |
| | | | 119/51.01 |
| 2017/0223925 A1* | 8/2017 | Neal | A01K 5/0275 |

FOREIGN PATENT DOCUMENTS

| | | |
|---|---|---|
| CN | 203058038 U | 7/2013 |
| CN | 104737935 A | 7/2015 |
| EP | 0741965 A1 | 11/1996 |

\* cited by examiner

AUTOMATIC FEEDER AND FEEDING PIPE THEREOF

TECHNICAL FIELD

The present invention relates to an automatic feeder and a feeding pipe thereof, particularly to an automatic feeder for breeding sows and piglets and a feeding pipe thereof.

BACKGROUND

The sow breeding quality will directly affect the survival rate and the growth quality of piglets. During sow breeding, the requirements on feeds are as follows:

firstly, the feed should be fresh, moist and softened, therefore is good in taste and appetizing. Actually, the feed, which is too dry or includes a lot of powder, will affect the taste, even induce respiratory diseases of the sows and indirectly affect the growth of the piglets;

secondly, sows eat randomly and will not eat at time points set by a breeder. Therefore, it may cause two situations: the feed is exhausted when the sows want to eat, and the feed is supplied when the sows do not want to eat. While, the feed after long-term exposure may be dehydrated and thus not suitable for eating by the sows;

thirdly, if fresh feed is not eaten by the sows in time, it is likely to be fermented, deteriorated and thus wasted. If the sows eat deteriorated feeds which contain a lot of harmful bacteria, the sow milk quality will decline, causing diarrhea and even death of the piglets. Meanwhile, deteriorated feeds have an unpleasant odor, which also affects the health of the piglets;

fourthly, a large number of breeders need to be employed for 24-hour breeding monitoring, which may cause huge breeding cost and is unbearable for normal pig breeding farms.

There is an automatic feeder in the market, and a working principle of the automatic feeder is that when a sow touches a sensor of the feeder, a feed is automatically discharged from a feeding spout to a feeding tank to be eaten by sows. However, the automatic feeder does not solve all of the above technical problems yet. This conventional automatic feeder cannot ensure that the feed in the feeding tank is eaten by the sows in time, that the feeder is launched when the sows want to eat, and that the health of the piglets won't be indirectly affected by excessive deteriorated feed in the feeding tank.

SUMMARY

The present invention designs an automatic feeder and a feeding pipe thereof to solve the technical problems of the conventional feeder: it cannot ensure that the feed in the feeding tank is eaten by sows in time, that the feeder is launched when the sows want to eat, and that the health of the piglets will not be indirectly affected by excessive deteriorated feed in the feeding tank.

In order to solve the above technical problems, the present invention provides an automatic feeder comprising a feeding pipe (1), a hopper (2), a spiral conveyor (3), a motor (4), a water supply pipeline (5) and a control unit (7); wherein a pressure sensor (14) is triggered and the feeding pipe (1) discharges a feed when a pig gnaws a gnawing block (12) on the feeding pipe (1); the hopper (2) is configured to be filled with a dry feed material; the spiral conveyor (3) has one end connected with the motor (4) and the other end located in the feeding pipe (1) and is configured to convey the dry feed material in the hopper (2) to the feeding pipe (1); the motor (4) provides power for rotation of the spiral conveyor (3); the water supply pipeline (5) provides water for mixing the dry feed material in the feeding pipe (1); and the control unit (7) powers on the motor (4) and opens the water supply pipeline (5) simultaneously after receiving a triggering signal from the pressure sensor (14), and powers off the motor (4) and closes the water supply pipeline (5) if not receiving the triggering signal from the pressure sensor (14).

Further, a mounting slot hole (16) for a triggering connecting lever is axially formed in the pipe wall of a discharging outlet (11) at the front end of the feeding pipe (1) and a mounting groove for gnawing block is radially formed in the pipe wall of the discharging outlet, the mounting slot hole (16) and the mounting groove are communicated with each other, a triggering connecting lever (13) has one end connected to the gnawing block (12) placed in the gnawing block mounting groove and the other end fixedly connected to the pressure sensor (14), and a gap is reserved between the triggering connecting lever (13) and the mounting slot hole (16); and when the gnawing block (12) is gnawed, the triggering connecting lever (13) is deformed to trigger the pressure sensor (14) to respond.

Further, the discharging outlet (11) at the front end of the feeding pipe (1) is connected with a conveying pipe (17) at the rear end of the feeding pipe (1), and the spiral conveyor (3) is arranged in the conveying pipe (17) at the rear end of the feeding pipe (1).

Further, the discharging outlet (11) is connected with the conveying pipe (17) via a connecting joint (18), and the pressure sensor (14) is fixed onto the connecting joint (18).

Further, the triggering connecting lever (13) is fixedly connected with the pressure sensor (14) via a connecting block (19).

The present invention also provides an automatic feeder comprising a feeding pipe (1), a hopper (2), a spiral conveyor (3), a motor (4), a water supply pipeline (5) and a control unit (7), wherein a pressure sensor (14) or a switch is triggered and the feeding pipe (1) discharges a feed when a sow or a piglet gnaws a gnawing block (12) on the feeding pipe (1); the hopper (2) is configured to be filled with a dry feed material; the spiral conveyor (3) has one end connected with the motor (4) and the other end located in the feeding pipe (1) and is configured to convey the dry feed material in the hopper (2) to the feeding pipe (1); the motor (4) provides power for rotation of the spiral conveyor (3); the water supply pipeline (5) provides water for mixing the dry feed material in the feeding pipe (1); and the control unit (7) powers on the motor (4) and the water supply pipeline (5) simultaneously after receiving a triggering signal of the pressure sensor (14) or the switch.

The automatic feeder further comprises a triggering connecting lever (13), wherein a gap is reserved between a lower part of one end of the triggering connecting lever (13) and the feeding pipe (1), which end is fixedly connected with the gnawing block (12), a lever fulcrum is located on the feeding pipe (1), and the sensor or the switch is triggered along with upward movement of the other end of the triggering connecting lever (13).

The automatic feeder further comprises a triggering connecting lever (13); a through hole is formed in the feeding pipe (1) in an axial direction; the triggering connecting lever (13) is inserted into the through hole; the triggering connecting lever (13) has one end fixed onto the wall of the feeding pipe (1); a middle part spaced from the feeding pipe (1) and connected with the gnawing block (12); and the other end for moving downwards to trigger the senor or the switch. When a sow gnaws the gnawing block (12) in the middle of the triggering connecting lever (13), a downward pressure is applied to the other end of the triggering connecting lever (13), and the senor or the switch is triggered to work when the other end of the triggering connecting lever (13) moves downwards as one end of the triggering connecting lever (13) is connected with the inner wall of the feeding pipe (1).

Further, the sensor is the pressure sensor; and the switch is the travel switch.

Further, the end of the spiral conveyor (3), connected with the motor (4), is higher than the other end located in the feeding pipe (1) to prevent the water in the water supply pipeline (5) from flowing into the hopper (2).

Further, the spiral conveyor (3) is connected with the motor (4) via a motor rod (41), and a stirring vane (42) for scattering the dry feed material is arranged on the motor rod (41).

Further, the water supply pipeline (5) is connected with a heater configured to heat water in the water supply pipeline (5).

Further, a water delivery pipeline (15) is connected between a water inlet of the water supply pipeline (5), which inlet enters the feeding pipe (1), and a water outlet of the feeding pipe (1), and is buried in the inner wall of the feeding pipe (1), and the water outlet of the feeding pipe (1) is located at the discharging outlet (11) of the feeding pipe (1).

Further, a feed receiving tank (6) is arranged below the feeding pipe (1).

The present invention further provides an automatic feeder comprising a feeding pipe (1), a hopper (2), a spiral conveyor (3), a motor (4), a water supply pipeline (5) and a control unit (7), wherein, the feeding pipe (1) discharges a feed when the sow or the piglet triggers infrared sensors through gnawing the feeding pipe (1); the hopper (2) is configured to be filled with a dry feed material; the spiral conveyor (3) has one end connected with the motor (4) and the other end placed in the feeding pipe (1), and is configured to convey the dry feed material in the hopper (2) to the feeding pipe (1); the motor (4) provides power for rotation of the spiral conveyor (3); the water supply pipeline (5) provides water mixing the dry feed material in the feeding pipe (1); the control unit (7) powers on the motor (4) and opens the water supply pipeline (5) simultaneously after receiving triggering signals of the infrared sensors; and the infrared sensors comprise a vertical infrared sensor (71) and a horizontal infrared sensor (72).

Compared with a conventional feeder, the automatic feeder of the present invention has the following beneficial effects.

(1) The automatic feeder will not discharge a fresh, moist and softened feed, which is the favorite for sows or piglets, until a sow or a piglet gnaws a feeding spout, so that feed waste and deterioration due to fermentation are avoided, and influence of the unqualified feed on the sow milk quality and harms of the unqualified feed to the piglets are prevented.

(2) The gnawing block and the sensor (or the switch) are respectively arranged at the two ends of the triggering connecting lever, so that a part gnawed by the sow or the piglet is completely isolated from a circuit control unit, and the sensor or the switch can be triggered through gnawing, thereby avoiding physical damage to the sensor or the switch resulted from gnawing and short circuits caused by saliva of the sow or the piglet and moisture in the feed.

(3) The end, connected with the motor, of the spiral conveyor is higher than the other end thereof located in the feeding spout to prevent water in the water supply pipeline from flowing into the hopper, so as to avoid pollution of the dry feed material in the hopper.

(4) The stirring vanes are arranged on the motor rod, so that dry feed blocks can be scattered via the stirring vanes when the motor rod rotates to ensure that the dry feed material entering the spiral conveyor is granular.

(5) The water supply pipeline is further connected with the heater, so that the sows or the piglets can be provided with a feed with a moderate temperature in winter, thereby avoiding diarrhea or gastrointestinal diseases of the sows or the piglets caused by a low-temperature feed.

(6) The water delivery pipeline is connected between the water inlet, entering the feeding spout, of the water supply pipeline and the water outlet of the feeding spout, and is configured to, on one hand, allow the dry feed material to be mixed with water at the discharging outlet to avoid influence on the health of the piglets caused by lots of fermented wet feed in the feeding spout when the feeding spout does not work, and on the other hand, connect the water supply pipeline to the rear end of the feeding spout because the sow or the piglet cannot gnaw the feeding spout if the water supply pipeline is arranged at the front end of the feeding spout.

(7) The feed receiving tank is also arranged below the feeding spout to further save the feed and ensure that overflowing feed during eating of the sows or the piglets can also be collected to avoid waste.

(8) The horizontal and vertical infrared sensors are arranged in the horizontal and vertical directions respectively relative to the sow or the piglet, and cannot be triggered at the same time until the sow or the piglet gnaws the feeding spout. Once the horizontal and vertical infrared sensors are triggered, the motor is powered on and the water supply pipeline is opened to convey the dry material feed and water to the sows or the piglets.

(9) An improvement is made by the present invention: an end of the triggering connecting lever is fixedly and directly connected with the pressure sensor, so that the whole mechanical structure of the feeder, and electrical signal transmission, triggering and response are more stable and reliable.

DETAILED DESCRIPTION

Figure 1:
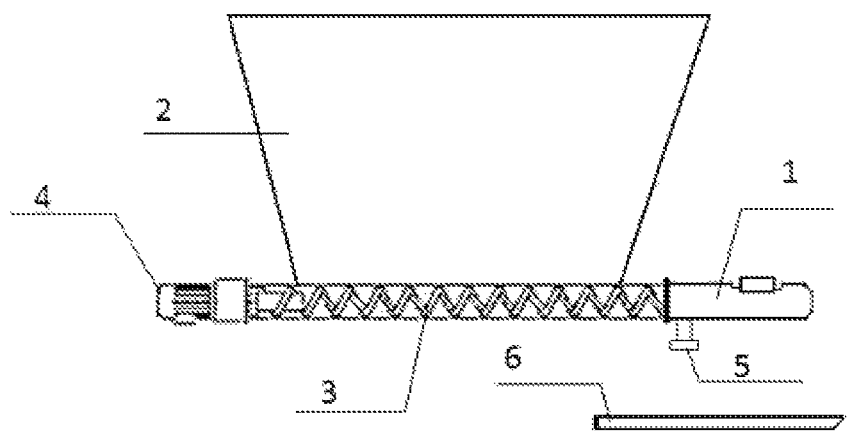
FIG. 1 is a schematic drawing of an automatic feeder according to a first embodiment of the present invention.

Referring to FIGS. 1 to 9, the present invention is further illustrated. In the description of the present invention, it should be understood that the orientation or position relations indicated via terms of "longitudinal", "transversal", "upper", "lower", "front", "rear", "left", "right", "vertical", "horizontal", "top", "bottom", "inside", "outside" and the like are based on orientation or the position relations shown in the drawings and they are only used for describing the present invention conveniently and simplify rather than indicating or implying that referred devices or elements must have particular orientations or be constructed and operated with the particular orientation, so that these terms cannot be construed as limiting of the present invention.

In the description of the present specification, the referring terms such as "an embodiment", "some embodiments", "an example", "a specific example" and "some examples" mean that particular features, structures, materials or characteristics described in combination of the embodiments or examples are included in at least one embodiment or example of the present invention. In the specification of the present invention, schematic description of the above terms does not necessarily refer to the same embodiment or example. Furthermore, the described particular features, structures, materials or characteristics can be integrated with any one or more embodiments or examples in a proper manner.

In the description of the present invention, unless otherwise specified and limited, it should be noted that the terms "mounted", "connected to/with" and "connected" need to be broadly understood, for example, connection may be mechanical connection, electrical connection, communication of inner parts of two elements, direct connection, or indirect connection via an intermediation, and those skilled in the art can understand the specific meaning of the above terms in accordance with specific conditions.

Figure 2:
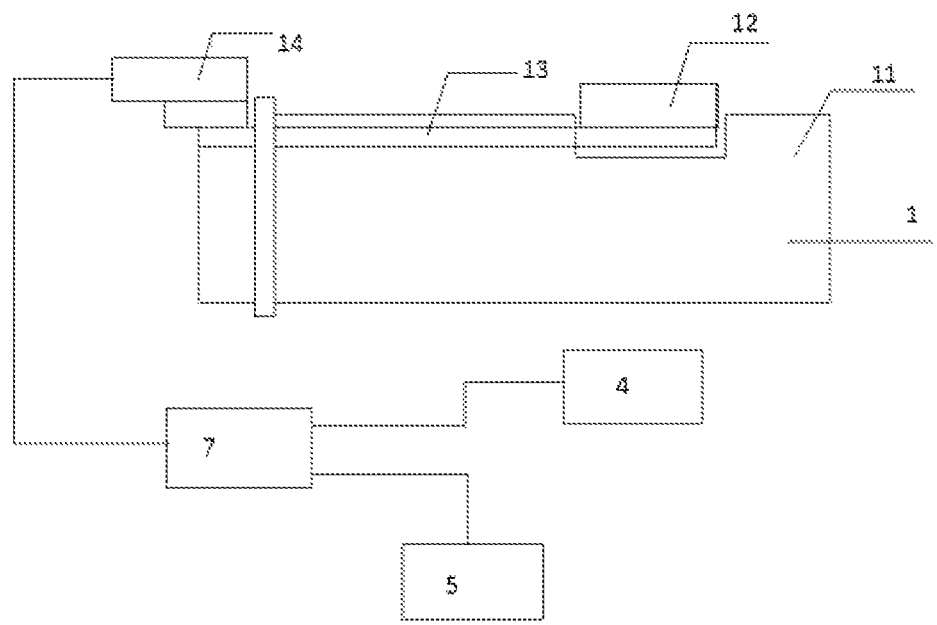
FIG. 2 is a control connection diagram of the automatic feeder of the present invention.

As shown in FIGS. 1 and 2, an automatic feeder comprises a feeding pipe 1, a hopper 2, a spiral conveyor 3, a motor 4, a water supply pipeline 5 and a control unit 7. A sensor or a switch is triggered to work and the feeding pipe 1 discharges a feed when a sow or a piglet gnaws a gnawing block 12 on the feeding pipe 1; the hopper 2 is configured to be filled with a dry feed material; the spiral conveyor 3 has one end connected with the motor 4 and the other end placed in the feeding pipe 1, and the spiral conveyor 3 is configured to convey the dry feed material in the hopper 2 to the feeding pipe 1; the motor 4 provides power for rotation of the spiral conveyor 3; the water supply pipeline 5 provides water for mixing the dry feed material in the feeding pipe 1; and the control unit 7 powers on the motor 4 and opens the water supply pipeline 5 simultaneously after receiving a triggering signal of a sensor or a switch.

A first working principle of the gnawing block 12 is as below: a triggering connecting lever 13 is arranged, a gap is reserved between a lower part of one end of the triggering connecting lever 13 and the feeding pipe 1, the end is fixedly connected with the gnawing block 12, a lever fulcrum is located on the feeding pipe 1, and the sensor or the switch is triggered to work when the other end of the triggering connecting lever 13 moves upwards. When a sow or a piglet gnaws the gnawing block 12, a downward pressure is applied to one end of the triggering connecting lever 13, so that the other end of the triggering connecting lever 13 moves upwards to trigger the senor or the switch to work. The sensor may be a pressure sensor, and the switch may be a travel switch.

A specific connecting structure may be realized as below: a through hole is formed in the feeding pipe 1 in the axial direction, a circular groove is formed in the feeding pipe 1 in the extending direction of the through hole, the triggering connecting lever 13 is inserted into the through hole, while a gap is reserved between the triggering connecting lever and the through hole, the front end of the triggering connecting lever 13 is located in the circular groove, another gap is reserved between the lower part of the front end of the triggering connecting lever 13 and the bottom of the circular groove, an upper part of the front end of the triggering connecting lever 13 is fixedly connected to the gnawing block 12, and the rear end of the triggering connecting lever 13 extends out of the feeding pipe 1 or is located in another circular groove in the feeding pipe 1; and when the gnawing block 12 is pressed down, the rear end of the triggering connecting lever 13 moves upwards to trigger the sensor or the switch to work.

A second working principle of the gnawing block 12 is as below: a triggering connecting lever 13 is arranged, a through hole is formed in the feeding pipe 1 in the axial direction, the triggering connecting lever 13 is inserted into the through hole, one end of the triggering connecting lever 13 is fixed onto the wall of the feeding pipe 1, a gap is reserved between the middle part of the triggering connecting lever 13 and the feeding pipe 1, the middle part of the triggering connecting lever 13 is connected with the gnawing block 12, and when the other end of the triggering connecting lever 13 moves downwards, a sensor or a switch is triggered to work. When a sow gnaws the gnawing block 12 in the middle of the triggering connecting lever 13, a downward pressure is applied to the other end of the triggering connecting lever 13, and the sensor or the switch is triggered to work when the other end of the triggering connecting lever 13 moves downwards as one end of the triggering connecting lever 13 is connected with the inner wall of the feeding pipe 1. The sensor may be a pressure sensor, and the switch may be a travel switch.

A specific connecting structure may be realized as below: a through hole is formed in the feeding pipe 1 in the axial direction, a circular groove is formed in the feeding pipe 1 in the extending direction of the through hole, the triggering connecting lever 13 is inserted into the through hole, while a gap is reserved between the triggering connecting lever and the through hole, the end part of the front end of the triggering connecting lever 13 is fixed in the circular groove, another gap is reserved between the other part of the triggering connecting lever 13 and the bottom of the circular groove, the front end of the triggering connecting lever 13 is fixedly connected to the gnawing block 12, and the rear end of the triggering connecting lever 13 extends out of the feeding pipe 1 or is located in another circular groove in the feeding pipe 1; and when the gnawing block 12 is pressed down, the rear end of the triggering connecting lever 13 moves downwards to trigger the sensor or the switch to work.

A working method of the automatic feeder provided by the present invention is as follows: when being gnawed by a pig, the gnawing block 12 triggers the sensor or the switch via the triggering connecting lever 13, the sensor or the switch sends a signal to the control unit, the control unit controls the motor 4 to be powered on and the water supply pipeline 5 to be opened synchronically according to the single output from the sensor or the switch, the motor 4 acts on the spiral conveyor 3 to enable the dry feed material in the hopper 2 to be conveyed to the feeding pipe 1, the water supply pipeline 5 conveys drinking water to the feeding pipe 1 at the same time, and after being mixed, the dry feed material and the drinking water are directly discharged to the mouth of the sow or the piglet to be eaten.

Figure 3:
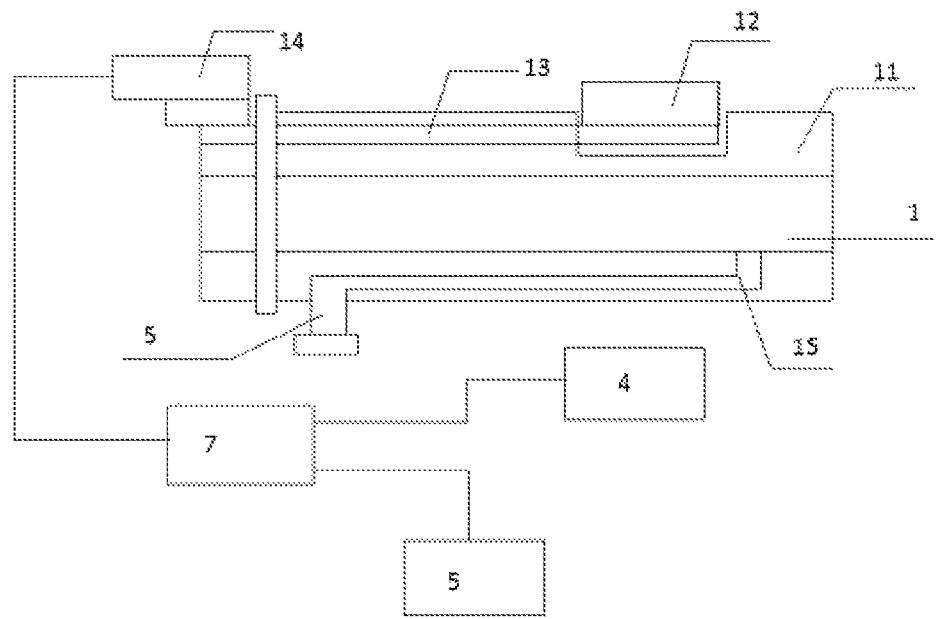
FIG. 3 is a piping diagram of a water supply system of the automatic feeder of the present invention.

As shown in FIG. 3, a water delivery pipeline 15 is connected between a water inlet, entering the feeding pipe 1, of the water supply pipeline 5 and a water outlet of the feeding pipe 1, and is buried in the inner wall of the feeding pipe 1, and the water outlet of the feeding pipe 1 is located at the inner wall of a discharging outlet 11 of the feeding pipe 1. The water supply pipeline 5 is further connected with a heater configured to heat water in the water supply pipeline 5.

Figure 4:
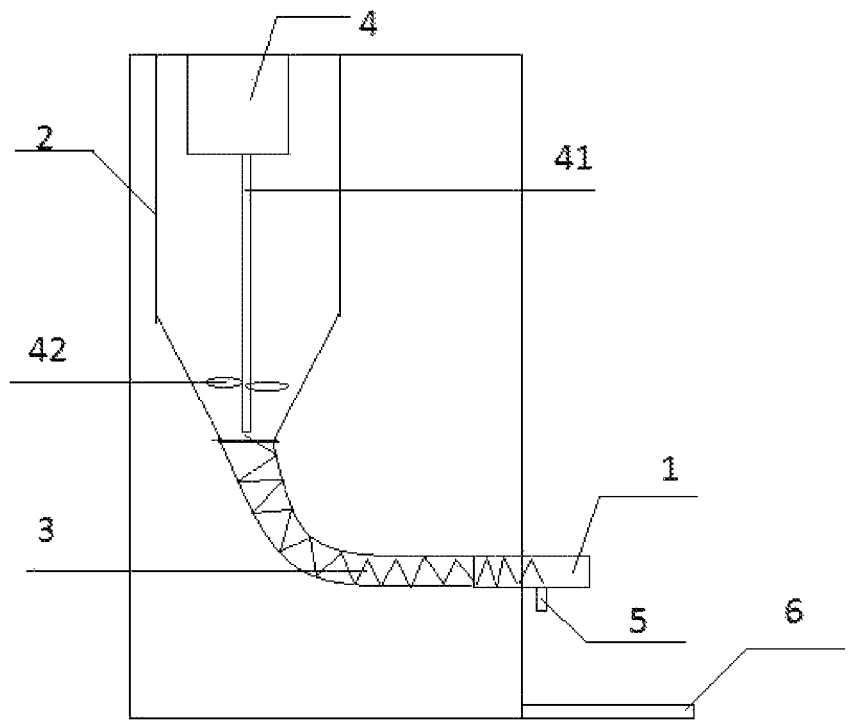
FIG. 4 is a schematic drawing of the automatic feeder according to a second embodiment of the present invention.

As shown in FIG. 4, the end, connected with the motor 4, of the spiral conveyor 3 is higher than the other end thereof located in the feeding pipe 1 to prevent water in the water supply pipeline from flowing into the hopper 2. The spiral conveyor 3 is connected with the motor 4 through a motor rod 41, and stirring vanes 42 for scattering the dry feed material are further arranged on the motor rod 41. A feed receiving tank 6 is also arranged below the feeding pipe 1.

Figure 5:
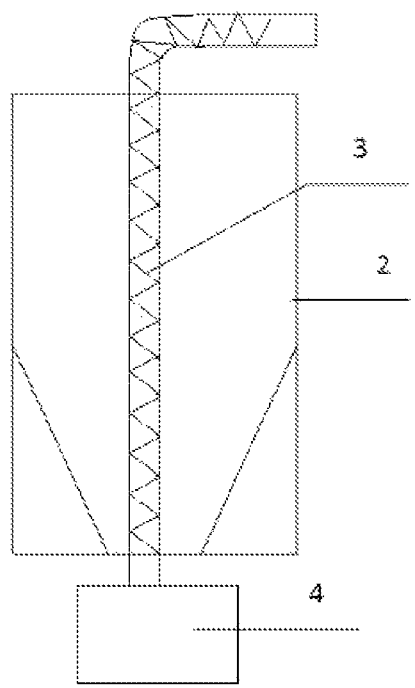
FIG. 5 is a schematic drawing of the automatic feeder according to a third embodiment of the present invention.

As shown in FIG. 5, the motor 4 may be arranged below the hopper 2, and the end, connected with the motor 4, of the spiral conveyor 3 is lower than the other end thereof located in the feeding pipe 1, so that the dry feed material moves upwards under the action of the motor, thereby realizing the purposes of the present invention.

Figure 6:
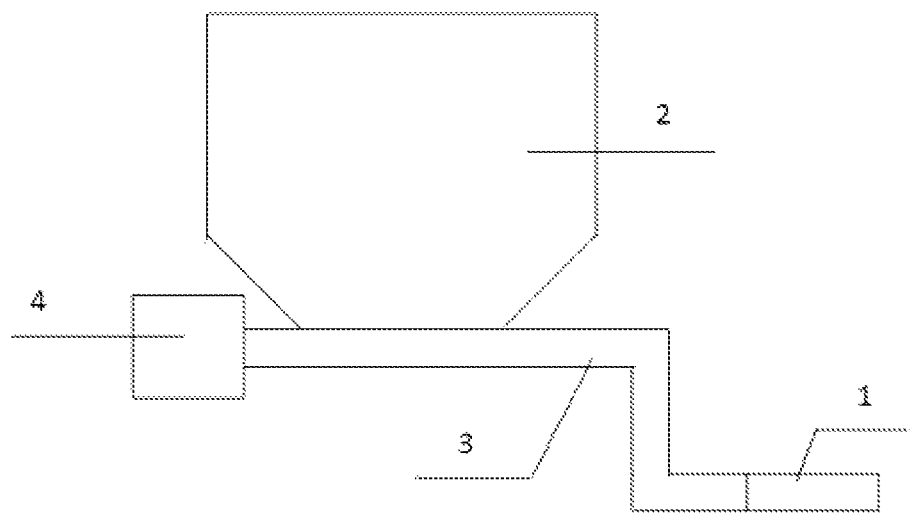
FIG. 6 is a schematic drawing of the automatic feeder according to a fourth embodiment of the present invention.

As shown in FIG. 6, an automatic feeder comprises a feeding pipe 1, a hopper 2, a spiral conveyor 3, a motor 4, a water supply pipeline 5 and a control unit 7. The feeding pipe 1 discharges a feed when a sow or a piglet gnaws a gnawing block 12 thereon, and a sensor or a switch is triggered to work when the gnawing block 12 is gnawed; the hopper 2 is configured to be filled with a dry feed material; one end of the spiral conveyor 3 is connected with the motor 4, the other end of the spiral conveyor is located in the feeding pipe 1, and the spiral conveyor 3 is configured to convey the dry feed material in the hopper 2 to the feeding pipe 1; the motor 4 provides power for rotation of the spiral conveyor 3; the water supply pipeline 5 provides water for the dry feed material in the feeding pipe 1 for feed mixing; and after receiving a triggering signal of the sensor or the switch, the control unit 7 controls the motor 4 to be powered on and the water supply pipeline 5 to be opened simultaneously. The spiral conveyor 3 adopts a stepped structure, the lower end of the stepped structure is connected with the feeding pipe 1, and the higher end of the stepped structure is connected with the motor 4. The spiral conveyor 3 with the stepped structure can also prevent water from entering the hopper 2.

Figure 7:
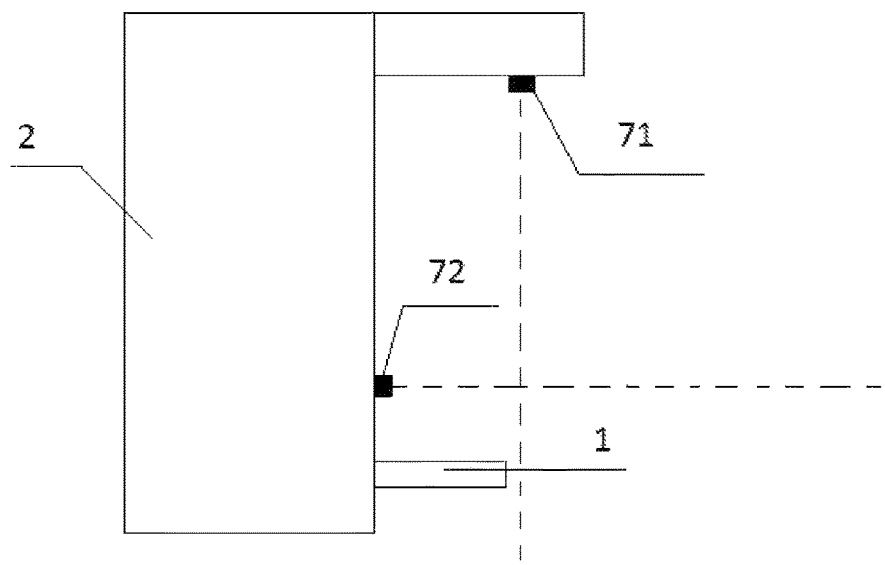
FIG. 7 is a connection diagram of a sensing mode of the automatic feeder of the present invention.

As shown in FIG. 7, an automatic feeder comprises a feeding pipe 1, a hopper 2, a spiral conveyor 3, a motor 4, a water supply pipeline 5 and a control unit 7; when being gnawed by a sow or a piglet, the feeding pipe 1 discharges a feed as the sow or the piglet triggers infrared sensors; the hopper 2 is configured to be filled with a dry feed material; one end of the spiral conveyor 3 is connected with the motor 4, the other end of the spiral conveyor is located in the feeding pipe 1, and the spiral conveyor 3 is configured to convey the dry feed material in the hopper 2 to the feeding pipe 1; the motor 4 provides power for rotation of the spiral conveyor 3; the water supply pipeline 5 provides water for the dry feed material in the feeding pipe 1 for feed mixing; after receiving triggering signals of the infrared sensors, the control unit 7 controls the motor 4 to be powered on and the water supply pipeline 5 to be opened simultaneously; and the infrared sensors comprise a vertical infrared sensor 71 and a horizontal infrared sensor 72. The horizontal infrared sensor 72 and the vertical infrared sensor 71 can be triggered at the same time when the sow or the piglet gnaws a feeding spout only, and accordingly, the motor 4 is powered on and the water supply pipeline 5 is opened to convey the dry material feed and water to the sows or the piglets.

Figure 8:
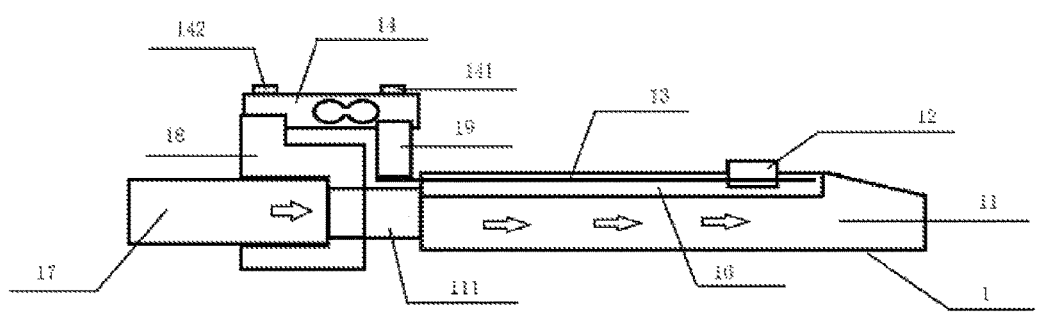
FIG. 8 is a schematic drawing of the automatic feeder according to a fifth embodiment of the present invention.

As shown in FIG. 8, an automatic feeder comprises a feeding pipe 1, a hopper 2, a spiral conveyor 3, a motor 4, a water supply pipeline 5 and a control unit 7. The feeding pipe 1 discharges a feed when a sow or a piglet gnaws a gnawing block 12 thereon, and a pressure sensor 14 is triggered when the gnawing block 12 is gnawed; the hopper 2 is configured to be filled with a dry feed material; one end of the spiral conveyor 3 is connected with the motor 4, the other end of the spiral conveyor is located in the feeding pipe 1, and the spiral conveyor 3 is configured to convey the dry feed material in the hopper 2 to the feeding pipe 1; the motor 4 provides power for rotation of the spiral conveyor 3; the water supply pipeline 5 provides water for the dry feed material in the feeding pipe 1 for feed mixing; after receiving a triggering signal of the pressure sensor 14, the control unit 7 controls the pressure motor 4 to be powered on and the water supply pipeline 5 to be opened simultaneously; and when not receiving the triggering signal of the pressure sensor 14, the control unit 7 controls the motor 4 to be powered off and the water supply pipeline 5 to be closed.

Specifically, a triggering connecting lever mounting slot hole 16 formed in the discharging outlet 11 at the front end of the feeding pipe 1 in the horizontal direction and a gnawing block mounting groove formed in the discharging outlet in the vertical direction are communicated with each other, one end of the triggering connecting lever 13 is connected to the gnawing block 12 located in the gnawing block mounting groove, the other end of the triggering connecting lever 13 is fixedly connected to the pressure sensor 14, and a gap is reserved between the triggering connecting lever 13 and the triggering connecting lever mounting slot hole 16; and when the gnawing block 12 is gnawed, the triggering connecting lever 13 is deformed to trigger the pressure sensor 14 to respond.

The discharging outlet 11 at the front end of the feeding pipe 1 is connected with a conveying pipe 17 at the rear end of the feeding pipe 1, and the spiral conveyor 3 is arranged in the conveying pipe 17 at the rear end of the feeding pipe 1.

The discharging outlet 11 is connected with the conveying pipe 17 via a connecting joint 18, and one end of the pressure sensor 14 is fixed to the connecting joint 18.

Figure 9:
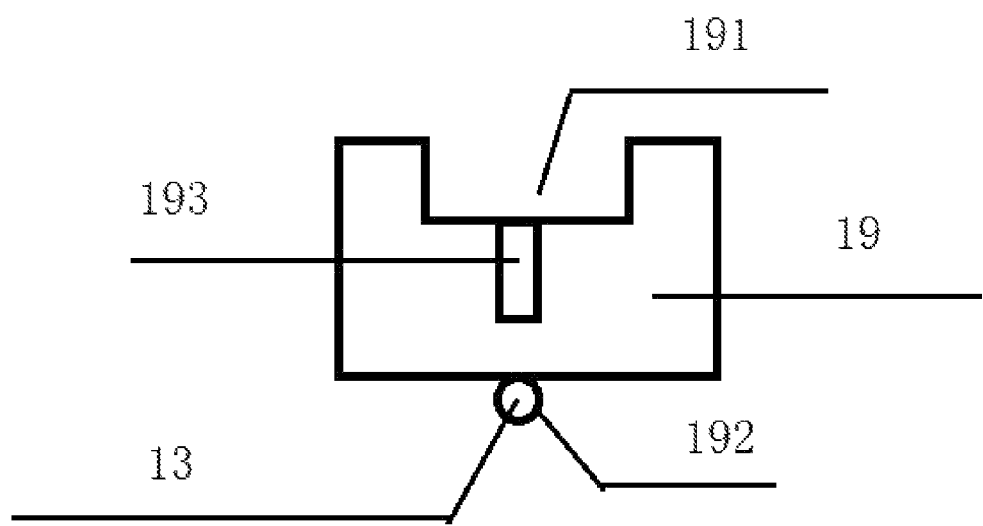
FIG. 9 is an enlarged diagram of a fixed groove in the schematic drawing according to a fifth embodiment of the automatic feeder of the present invention.

The triggering connecting lever 13 is connected with the other end of the pressure sensor 14 via a connecting block 19. As shown in FIG. 9, a fixed ring 192 is arranged at one end of the connecting block 19, and the triggering connecting lever 13 is inserted into and in interference fit with the fixed ring 192; a fixed groove 191 is formed in the other end of the connecting block 19, and one end of the pressure sensor 14 is clamped in the fixed groove 191 and is fixed to the connecting block 19 via a first fixing bolt 141; and the other end of the pressure sensor 14 is fixed to the connecting joint 18 via a second fixing bolt 142.

One end, connected with the motor 4, of the spiral conveyor 3 is higher than the other end thereof located in the feeding pipe 1 to prevent water in the water supply pipeline 5 from flowing into the hopper 2.

The spiral conveyor 3 is connected with the motor 4 via a motor rod 41, and stirring vanes 42 for scattering the dry feed material are further arranged on the motor rod 41.

The water supply pipeline 5 is also connected with a heater configured to heat water in the water supply pipeline 5.

A water delivery pipeline 15 is connected between a water inlet, entering the feeding pipe 1, of the water supply pipeline 5 and a water outlet of the feeding pipe 1, and is buried in the inner wall of the feeding pipe 1, and the water outlet of the feeding pipe 1 is located at the inner wall of the discharging outlet 11 of the feeding pipe 1.

A feed receiving tank 6 is also arranged below the feeding pipe 1.

It should be noted that the present invention is applicable to not only sows and piglets, but also boars.

A feeding pipe is provided, wherein: a triggering connecting lever mounting slot hole 16 axially formed in the pipe wall of a discharging outlet 11 at the front end of the feeding pipe 1 and a gnawing block mounting groove radially formed in the pipe wall of the discharging outlet are communicated with each other, one end of a triggering connecting lever 13 is connected to a gnawing block 12 located in the gnawing block mounting groove, the other end of the triggering connecting lever 13 is fixedly connected to a pressure sensor 14 or a switch, and a gap is reserved between the triggering connecting lever 13 and the triggering connecting lever mounting slot hole 16; and when the gnawing block 12 is gnawed, the triggering connecting lever 13 is deformed to trigger the pressure sensor 14 or the switch to respond.

The present invention is exemplarily described in combination with the drawings, while it is clear that the implementation of the present invention is free of limitation of the above-described manners, and various improvements adopting the ideas and the technical solutions of the present invention or the ideas and the technical solutions of the present invention without improvements and applied to other occasions shall fall into the protection scope of the present invention.

| REFERENCE NUMERALS | |
| --- | --- |
| 1-Feeding Pipe | 11-Discharging outlet |
| 111-Fixed End Part | 12-Gnawing Block |
| 13-Triggering Connecting lever | 14-Pressure Sensor |
| 141-First Fixing Bolt | 142-Second Fixing Bolt |
| 15-Water Delivery Pipeline | 16-Triggering Connecting lever Mounting Slot Hole |
| 17-Conveying Pipe | 18-Connecting joint |
| 19-Connecting Block | 191-Fixed Groove |
| 192-Fixed ring | 193-Threaded Hole |
| 2-Hopper | 3-Spiral conveyor |
| 4-Motor | 41-Motor Rod |
| 42-Stirring Vane | 5-Water Supply Pipeline |
| 6-Feed Receiving Tank | 7-Control Unit |
| 71-Vertical Infrared Sensor | 72-Horizontal Infrared Sensor |

The invention claimed is:

1. An automatic feeder comprising a feeding pipe (1) discharging a feed when a pig gnaws a gnawing block (12) thereon and thus triggers a pressure sensor (14) or a switch, a hopper (2) configured to be filled with a dry feed material, a motor (4), a spiral conveyor (3) for conveying the dry feed material in the hopper (2) to the feeding pipe (1) and having one end connected with the motor (4) to receiving its power for rotation and the other end placed in the feeding pipe (1), a water supply pipeline (5) for providing water for mixing the dry feed material in the feeding pipe (1), and a control unit (7) for powering on the motor (4) and opening the water supply pipeline (5) simultaneously after receiving a triggering signal of the pressure sensor (14) or the switch and powering off the motor (4) and closing the water supply pipeline (5) when not receiving the triggering signal of the pressure sensor (14) or the switch, wherein a mounting slot hole (16) of a triggering connecting lever is axially formed in a pipe wall of a discharging outlet (11) at a front end of the feeding pipe (1) and a mounting groove of the gnawing block is radially formed in the pipe wall of the discharging outlet, the mounting slot hole (16) and the mounting groove are communicated with each other; one end of the triggering connecting lever (13) is connected to the gnawing block (12) located in the mounting groove, the other end of the triggering connecting lever (13) is fixedly connected to the pressure sensor (14) or the switch; a gap is reserved between the triggering connecting lever (13) and the mounting slot hole (16); and when the gnawing block (12) is gnawed, the triggering connecting lever (13) is deformed to trigger the pressure sensor (14) or the switch to respond.

2. The automatic feeder of claim 1, characterized in that the discharging outlet (11) at the front end of the feeding pipe (1) is connected with a conveying pipe (17) at a rear end of the feeding pipe (1), and the spiral conveyor (3) is arranged in the conveying pipe (17) at the rear end of the feeding pipe (1).

3. The automatic feeder of claim 1, characterized in that the discharging outlet (11) is connected with the conveying pipe (17) via a connecting joint (18), and the pressure sensor (14) is fixed onto the connecting joint (18).

4. The automatic feeder of claim 3, characterized in that the triggering connecting lever (13) is fixedly connected with the pressure sensor (14) via a connecting block (19).

5. The automatic feeder of claim 1, characterized in that one end, connected with the motor (4), of the spiral conveyor (3) is higher than the other end thereof located in the feeding pipe (1) to prevent water in the water supply pipeline (5) from flowing into the hopper (2).

6. The automatic feeder of claim 1, characterized in that the spiral conveyor (3) is connected with the motor (4) via a motor rod (41), and a stirring vane (42) for scattering the dry feed material is arranged on the motor rod (41).

7. The automatic feeder of claim 1, characterized in that the water supply pipeline (5) is further connected with a heater configured to heat water in the water supply pipeline (5).

8. The automatic feeder of claim 7, characterized in that a water delivery pipeline (15) is connected between a water inlet, entering the feeding pipe (1), of the water supply pipeline (5) and a water outlet of the feeding pipe (1), and is buried in an inner wall of the feeding pipe (1); and the water outlet of the feeding pipe (1) is located at an inner wall of the discharging outlet (11) of the feeding pipe (1).

9. The automatic feeder of claim 1, characterized in that a water delivery pipeline (15) is connected between a water inlet, entering the feeding pipe (1), of the water supply pipeline (5) and a water outlet of the feeding pipe (1), and is buried in an inner wall of the feeding pipe (1); and the water outlet of the feeding pipe (1) is located at an inner wall of the discharging outlet (11) of the feeding pipe (1).

10. A feeding pipe, characterized in that: a mounting slot hole (16) of a triggering connecting lever is axially formed in a pipe wall of a discharging outlet (11) at a front end of the feeding pipe (1) and a mounting groove of a gnawing block is radially formed in the pipe wall of the discharging outlet, the mounting slot hole (16) and the mounting groove are communicated with each other; one end of the triggering connecting lever (13) is connected to the gnawing block (12) located in the mounting groove, and the other end of the triggering connecting lever (13) is fixedly connected to a pressure sensor (14) or a switch; a gap is reserved between the triggering connecting lever (13) and the mounting slot hole (16); and when the gnawing block (12) is gnawed, the triggering connecting lever (13) is deformed to trigger the pressure sensor (14) or the switch to respond.

\* \* \* \* \*